(12) United States Patent
Kudelski

(10) Patent No.: US 8,181,008 B2
(45) Date of Patent: May 15, 2012

(54) SECURE SYSTEM-ON-CHIP

(75) Inventor: André Kudelski, Lutry (CH)

(73) Assignee: Nagracard S.A., Cheseaux-sur-Lausanne (CH)

( * ) Notice: Subject to any disclaimer, the term of this patent is extended or adjusted under 35 U.S.C. 154(b) by 1418 days.

(21) Appl. No.: 11/614,696

(22) Filed: Dec. 21, 2006

(65) Prior Publication Data

US 2007/0234072 A1 Oct. 4, 2007

(30) Foreign Application Priority Data

Dec. 23, 2005 (EP) .................................. 05112983

(51) Int. Cl.
*G06F 21/00* (2006.01)
(52) U.S. Cl. ............... 713/150; 713/190; 726/9; 726/20
(58) Field of Classification Search .................. 713/150, 713/172, 190; 726/9, 20
See application file for complete search history.

(56) References Cited

U.S. PATENT DOCUMENTS

| | | | | |
|---|---|---|---|---|
| 5,533,123 | A * | 7/1996 | Force et al. ................... | 713/189 |
| 5,883,956 | A * | 3/1999 | Le et al. ........................ | 713/170 |
| 6,681,331 | B1 * | 1/2004 | Munson et al. ................. | 726/23 |
| 7,058,918 | B2 * | 6/2006 | Abramovici et al. ......... | 716/126 |
| 7,093,295 | B1 * | 8/2006 | Saito ................................ | 726/26 |
| 7,185,367 | B2 * | 2/2007 | Munson ......................... | 726/23 |
| 7,289,537 | B1 * | 10/2007 | Devanagondi et al. ....... | 370/474 |
| 7,352,206 | B1 * | 4/2008 | Zhu et al. ........................ | 326/38 |
| 7,420,952 | B2 * | 9/2008 | da Costa et al. .............. | 370/338 |
| 7,472,051 | B2 * | 12/2008 | Mariani et al. ................. | 703/13 |
| 7,587,611 | B2 | 9/2009 | Johnson et al. | |
| 7,596,144 | B2 * | 9/2009 | Pong ............................. | 370/400 |
| 7,596,812 | B2 | 9/2009 | Li et al. | |
| 7,681,247 | B2 * | 3/2010 | Williams ........................ | 726/34 |
| 7,725,784 | B2 * | 5/2010 | Laouamri et al. ............. | 714/724 |
| 2004/0010712 | A1 * | 1/2004 | Hui et al. ....................... | 713/201 |
| 2004/0158721 | A1 | 8/2004 | Candelore | |
| 2004/0240394 | A1 * | 12/2004 | Cochard et al. ................ | 370/253 |
| 2005/0033969 | A1 * | 2/2005 | Kiiveri et al. .................. | 713/189 |
| 2005/0050387 | A1 * | 3/2005 | Mariani et al. .................. | 714/13 |
| 2005/0060567 | A1 * | 3/2005 | Shannon et al. .............. | 713/200 |
| 2005/0086497 | A1 | 4/2005 | Nakayama | |

(Continued)

FOREIGN PATENT DOCUMENTS

WO 2004/015553 2/2004

(Continued)

OTHER PUBLICATIONS

European Search Report issued in EP 05 11 2980, dated Sep. 14, 2006.

(Continued)

*Primary Examiner* — David García Cervetti
(74) *Attorney, Agent, or Firm* — DLA Piper LLP US

(57) ABSTRACT

The aim of the present invention is to provide a secure system-on-chip for processing data, this system-on-chip having at least a central processing unit, an input and an output channel, an encryption/decryption engine and a memory. The system-on-chip having real-time working conditions while receiving and sending data, having an autonomous supervision module which is preprogrammed with normal working conditions definitions of at least the input and/or output data flow to enable or disable the input/output channel according to the comparison on the real-time working conditions and the normal working conditions definitions.

15 Claims, 3 Drawing Sheets

U.S. PATENT DOCUMENTS

| | | |
|---|---|---|
| 2005/0086665 A1* | 4/2005 | Matsuura .................. 719/321 |
| 2005/0114619 A1 | 5/2005 | Matsuo et al. |
| 2005/0213766 A1 | 9/2005 | Goss |
| 2005/0237083 A1* | 10/2005 | Bakker et al. ................ 326/47 |
| 2006/0075252 A1 | 4/2006 | Kallahalla et al. |
| 2006/0109982 A1* | 5/2006 | Puiatti et al. .............. 380/200 |
| 2006/0274788 A1* | 12/2006 | Pong ......................... 370/469 |
| 2007/0050642 A1* | 3/2007 | Flynn et al. ................ 713/192 |
| 2007/0067644 A1* | 3/2007 | Flynn et al. ................ 713/189 |
| 2007/0106923 A1* | 5/2007 | Aitken et al. .............. 714/718 |
| 2007/0150752 A1* | 6/2007 | Kudelski .................... 713/190 |
| 2007/0150756 A1* | 6/2007 | Kudelski .................... 713/194 |
| 2008/0034334 A1* | 2/2008 | Laouamri et al. ............. 716/4 |
| 2008/0271146 A1 | 10/2008 | Rooney et al. |

FOREIGN PATENT DOCUMENTS

| | | |
|---|---|---|
| WO | 2006/056572 | 6/2006 |

OTHER PUBLICATIONS

File Wrapper of U.S. Appl. No. 11/614,816.

U.S. Appl. No. 11/614,816, filed Dec. 21, 2006, Pending.

Office Action issued in U.S. Appl. No. 11/614,816, on Feb. 2, 2012.

* cited by examiner

US 8,181,008 B2

SECURE SYSTEM-ON-CHIP

INTRODUCTION

The present invention concerns the field of system-on-chirp and in particular the security around it.

BACKGROUND ART

System-on-a-chip or System on Chip (SoC or SOC) is an idea of integrating all components of a computer or other electronic system into a single integrated circuit (chip). It may contain digital, analog, mixed-signal and often radio-frequency functions—all on one chip. A typical application is in the area of embedded systems.

Secure environment for processors have been already disclosed, in particular with respect to multi-processing architecture. For example, a solution to limit the access to a secure memory was described in the document WO04015553. According to this solution, the processor has two modes of operations; in the first mode, called the secure mode, access is permitted to the secure memory; and in the unsecure mode, the access to the secure memory is forbidden. The unsecure mode is intended to development purposes, i.e. testing or debugging the circuit. During the execution in unsecure mode, the access to the secure memory is physically blocked, i.e. a "disable" signal is generated. This "disable" signal forbids any attempt to access the secure memory.

Another solution is described in the document PCT/EP2005/056145 in which a single chip descrambling processor processes the scrambled audio/video data in order to never leave access to the clear data. When the descrambling operation is done, the descrambling unit comprises an encryption engine to encrypt the descrambled data before they are temporarily stored in an external memory. When the processor finishes the organization task, the data are decrypted in the output module and sent to the displaying device.

BRIEF DESCRIPTION OF THE INVENTION

The aim of the present invention is to provide a secure system-on-chip for processing data, this system-on-chip comprising at least a central processing unit, an input and an output channel, an encryption/decryption engine and a memory, the system-on-chip having real-time working conditions while receiving and sending data, characterized in that it comprises an autonomous supervision module (SM) which is preprogrammed with normal working conditions definitions of at least the input and/or output data flow, and configured to enable or disable the input and/or output channel according to the comparison on the real-time working conditions and the normal working conditions definitions.

The main feature of the invention is an independent module, independent from the central processing unit and having its own processor core and executing supervision task.

These tasks are defined by a set of normal working condition definitions defining the normal timing diagram and data flow within the system-on-chip. The normal working conditions are compared with the real-time working conditions when the system-on-chip receives, process and sends data.

BRIEF DESCRIPTION OF THE DRAWINGS

The invention will be better understood thanks to the attached figures in which:

the FIG. 1 describes the system-on-chip and its various elements in the encryption/decryption mode, the FIGS. 2A and 2B describes the encryption stage using two units, the FIG. 3 describes the system-on-chip and its various elements in the signature mode, the 4 shows an example of an enlarged system-on-chip in which the secure and unsecure modules are located within the same chip.

DETAILED DESCRIPTION OF THE INVENTION

Figure 1:
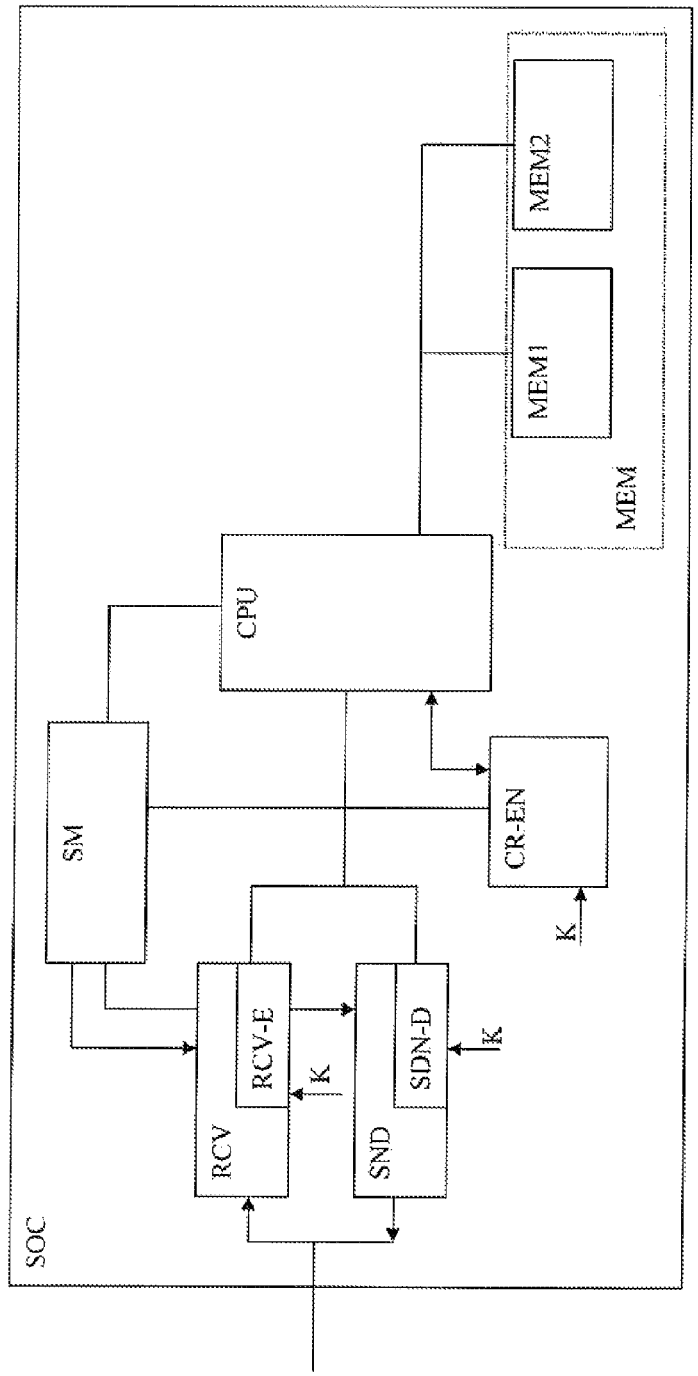

According to a first aspect of the invention illustrated in the FIG. 1, the system-on-chip SOC comprises an autonomous supervision module SM that can deterministically control the system-on-chip SOC. This module SM, comprises a normal working condition definitions of the system-on-chip SOC, and disabling means when the normal conditions are no longer fulfilled. This is achieved in different ways. A first method includes measuring the quantity of data outputted, e.g. counting the number of data sets outputted. This operation will be hereafter described as counting data. A second method includes defining time windows during which input or output operations are allowed. A block of data is therefore is allowed if the length of same do not exceed the maximum time defined for a block. A third method includes detecting the state of the central unit CPU and their respective duration, and acting accordingly as will be illustrated hereafter. The central unit CPU typically has different possible states, such as acquisition state, processing state, waiting state and outputting result state. When a message arrives to the system-on-chip, the same switches from waiting state to acquisition state. During that acquisition state, the input channel is enabled by the supervision module SM. Also during the same acquisition state, the supervision module SM counts the data arriving and compares this number to a predefined maximum. Any abnormal situation leads to a warning state in which the central unit CPU can decide how to react. The supervision module SM has the capability, especially in case of a warning state, to block the input and output channels and/or the encryption/decryption engine CR-EN.

When the external message is received, the supervision module SM causes the central unit CPU to go to processing state. During this state, the input and output channels are disabled. The supervision module SM comprises a time pattern corresponding to the minimum processing time by the central unit CPU, and disables the channels during this time. The central unit CPU can inform the supervision module SM that no result will be outputted. This has the consequence that the supervision module SM only enables the input channel for waiting a new message. The output channel then remains disabled.

In a case where the central unit CPU wishes to send data to the external world, it then informs accordingly the supervision module SM, which in turn enables the output channel. The supervision module SM still continues to watch the activities on the output channel by counting the data sent and applying a time window during which the sending is authorized.

In this embodiment of the invention, the supervision module SM is thus able to work with information received from the central unit CPU, as well as with preprogrammed working patterns.

This module can also watch the encryption/decryption engine CR-EN by counting the data encrypted or decrypted. In the same manner, the working pattern of the encryption/decryption engine CR-EN is supervised in term of data quantity processed and time. The supervision module can disable the encryption/decryption engine CR-EN if abnormal conditions are detected.

It is to be noted that the supervision module SM can be implemented in a system-on-chip without the encryption/decryption in the input/output channel. The data are processed without adding an additional encryption (or decryption) level and the input/output channel is watched by the supervision module SM.

According to a second aspect of the invention, it is proposed a secure system-on-chip for processing data, this system-on-chip comprising at least a central processing unit, an input and an output channel, an encryption/decryption engine and a memory, characterized in that, the input channel comprises an input encryption module to encrypt all incoming data, the output channel comprising an output decryption module to decrypt all outgoing data, the central processing unit receiving the encrypted data from the input encryption module and storing them in the memory, and while processing the stored data, the central processing unit reading the stored data from the memory, requesting decryption of same in the encryption/decryption engine, processing the data and requesting encryption of the result by the encryption/decryption engine and storing the encrypted result, outputting the result to the output decryption module for decryption purpose and exiting the decrypted result via the output channel.

In this embodiment, the encryption occurs for data even in an environment considered as safe. The decryption occurs only at the later stage when the data are really used by the central unit the clear data being never accessible in a static state. When processed, the data can be stored in clear if they are for internal purpose or re-encrypted it they are intended to be outputted from the system-on-chip.

Once re-encrypted, the data are temporarily stored in a buffer before being sent to the output channel.

The key to encrypt and decrypt the data is in a preferred embodiment unique for that system-on-chip. This key can be preprogrammed at the manufacturing step or can be randomly generated at the initialization stage and never known by anybody. This key is used only internally. The algorithm used can be kept secret as well as the parameters of the algorithm. For example, the algorithm IdeaNxt is used as encryption engine and the values of the substitution box are randomly generated in the system-on-chip.

According to a particular embodiments the encryption/decryption algorithm is asymmetric, so that a key pair (public/private) is used to respectively encrypt and decrypt the data.

According to an alternative embodiment, the input encryption module can be replaced by a signature module, the data being signed while entering in the system-on-chip and the signature stored together with the data. When the central unit wishes to use this data, the encryption/decryption engine which is now a signature verification engine, checks the signature and authorizes the use of the data if the signature is correct.

By data it is meant a single byte or a set of bytes e g, to form a message or a entitlement message in the system-on-chip.

The secure system-on-chip SOC is based on a central processing unit CPU. The aim of this unit is to execute the code and to perform the requested tasks. The system-on-chip SOC comprises two channels connected to the outer world, namely the input and the output channels. The input channel RCV comprises an input encryption module RCV-E which encrypts all the data coming from the outer world. In the same manner, the output channel SND comprises an output decryption module SND-D to decrypt the data received from the central unit CPU before sending them to the outer world.

The central unit CPU has access to the encryption/decryption engine CR-EN. This engine has the same function as the input encryption module and the output decryption module, The key K loaded in the input encryption module is the same in the encryption part of the encryption/decryption engine. The same applies to the output decryption module and the decryption part of the encryption/decryption engine, for the decryption operations. When the central unit CPU needs some data, either directly coming from the input encryption module or fetched from the memory MEM, these data are first passed through the decryption engine to decrypt them before they are used by the central unit CPU.

In the same manner, when the central unit CPU has completed a task and produces a result, the following step being to store the result (or output the result to the output channel), This result is previously passed through the encryption engine CR-EN for encryption before being stored, This encrypted result can then be stored in a memory or sent to the output channel.

Figure 2B:
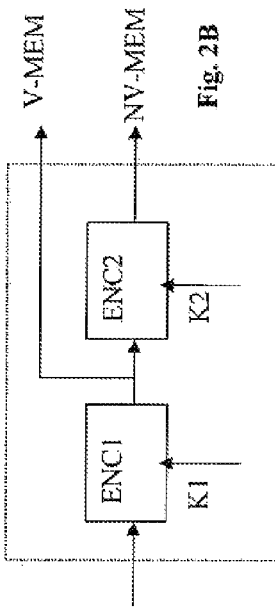
Figure 2A:
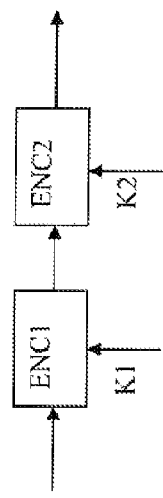

The central processing unit CPU can decide if the result is t be re-encrypted or left in clear. Instead of letting the processor to decide, the target location can select different behaviors as shown in FIG. 2A. If the result is to be stored in a volatile memory V-MEM, the double encryption can takes place. In the contrary if the storage is in a non-volatile memory NV-MEM (EEPROM), only one encryption unit is used, the one with the permanent key. In the same manner, when, reading data from the volatile memory, the double decryption is applied although reading data from the non-volatile memory, only one decryption unit is applied.

Figure 3:
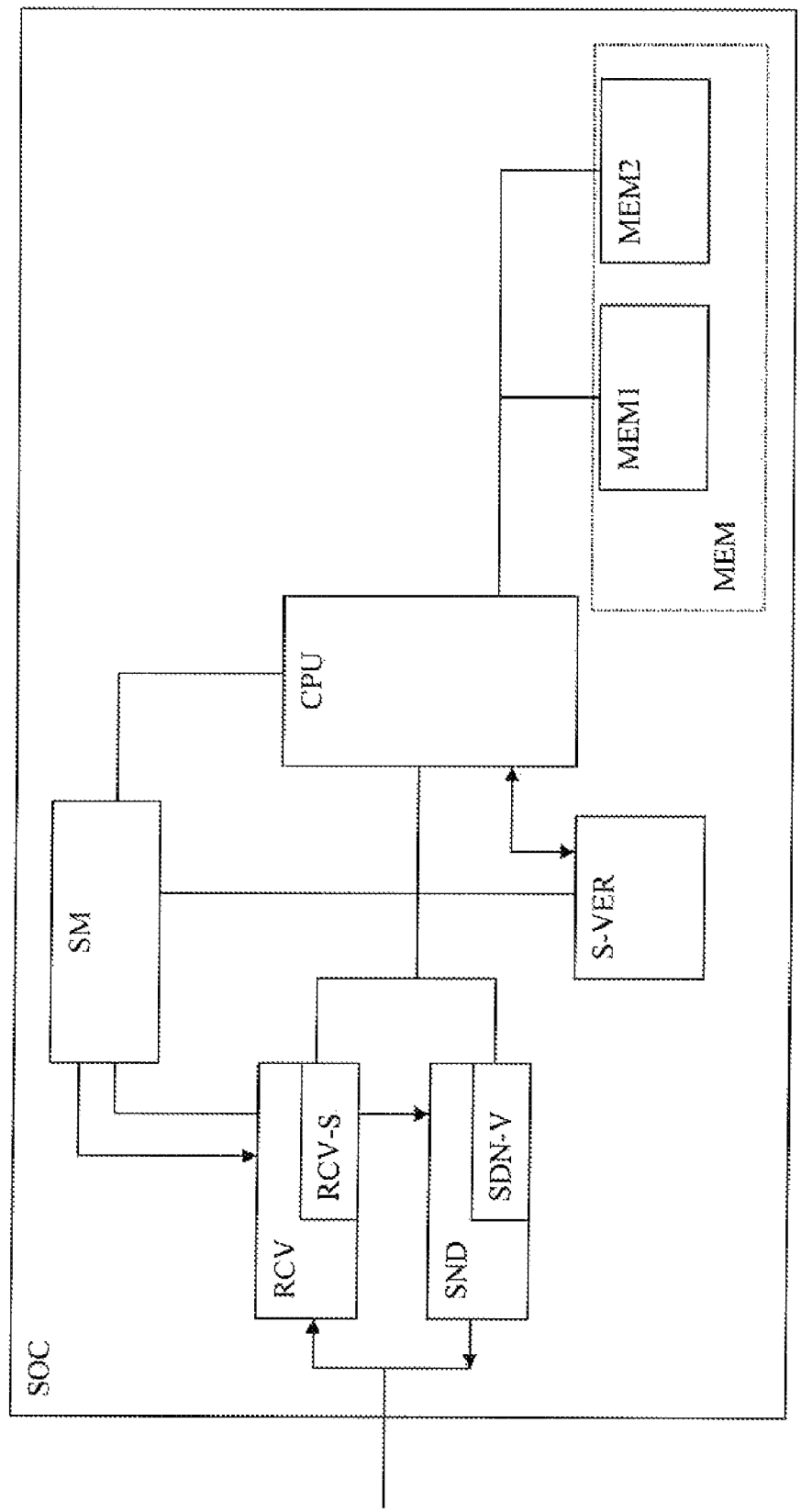

According to an alternative embodiment shows in the FIG. 3, the encryption process is replaced by a signature process. The data are not encrypted but a signature is generated and associated with the data. For all data coming from the outer world, a signature is calculated, in the input signature module RCV-S. The data are then stored with their signatures. When the central unit needs to access these data, the signature verification engine S-VER first verifies the signature before the central unit has the right to use the data. Before the data are outputted by the output channel, the signature is verified in the output signature module SDN-V. The signature is then removed from the data which are sent to the output channel SND.

According to an alternative embodiment, the encryption/decryption engine is directly located in the central unit CPU. When a data is read from the memory, e.g. loading a variable in the accumulator of the CPU (e.g. LDAA #1200h for Motorola 68HC11), the date read at that location is passed automatically to the decryption engine before being transferred to the accumulator. In the same manner, the instruction to store the content of the accumulator to the memory (elg. STAA #1200h) is not directly executed but the data in the accumulator is previously passed through the encryption engine before being stored at the location 1200h.

In a particular embodiment, the encryption/decryption engine is shared with the input and output channel, The input encryption module is therefore a virtual module and encryption operations at the input channel are achieved by the encryption engine through a data multiplexer. The data entering into the system-on-chip SOC, in particular through the input channel are passed through the encryption engine before further manipulation e.g. to store the data in an input buffer, the input encryption module is therefore a virtual module using the resource of the encryption/decryption engine in encryption mode. The same apply for the output decryption module which uses the encryption/decryption engine in decryption mode.

The input encryption module RCV-E can comprise more than one encryption unit. According to a particular embodiment shows in the FIG. 2A, two encryption units (or more) are connected in series, each having a different key. The first encryption unit is loaded with a key K1 which pertains to the system-of chip, i.e. is unique and constant for a specific device. This key is either loaded during the installation step or generated internally. The second unit ENC2 is loaded with a key K2 which is dynamically generated at the power up of the device. When the system-on-chip is reinitialized, this key is lost and a new key is generated. The data which have to be permanently stored, once processed by the processor CPU, are only re-encrypted with the first unit with the permanent key K1.

The output decryption module as well as the encryption/decryption engine comprise in the same manner also two or more units.

Alternatively, if the processor CPU recognize that the received data, stored in an input buffer, don't need to be processed but only have to be stored in a permanent memory NV-MEM, the processor can request from the encryption/decryption engine the decryption by only one decryption unit, i.e. the unit having the volatile key. The stored data still remain encrypted by the permanent key for later use.

This System-on-chip SOC is used as secure access control module in charge of receiving management messages including rights or keys. This module can also comprises an high speed descrambling unit to receive an encrypted video data stream.

Figure 4:
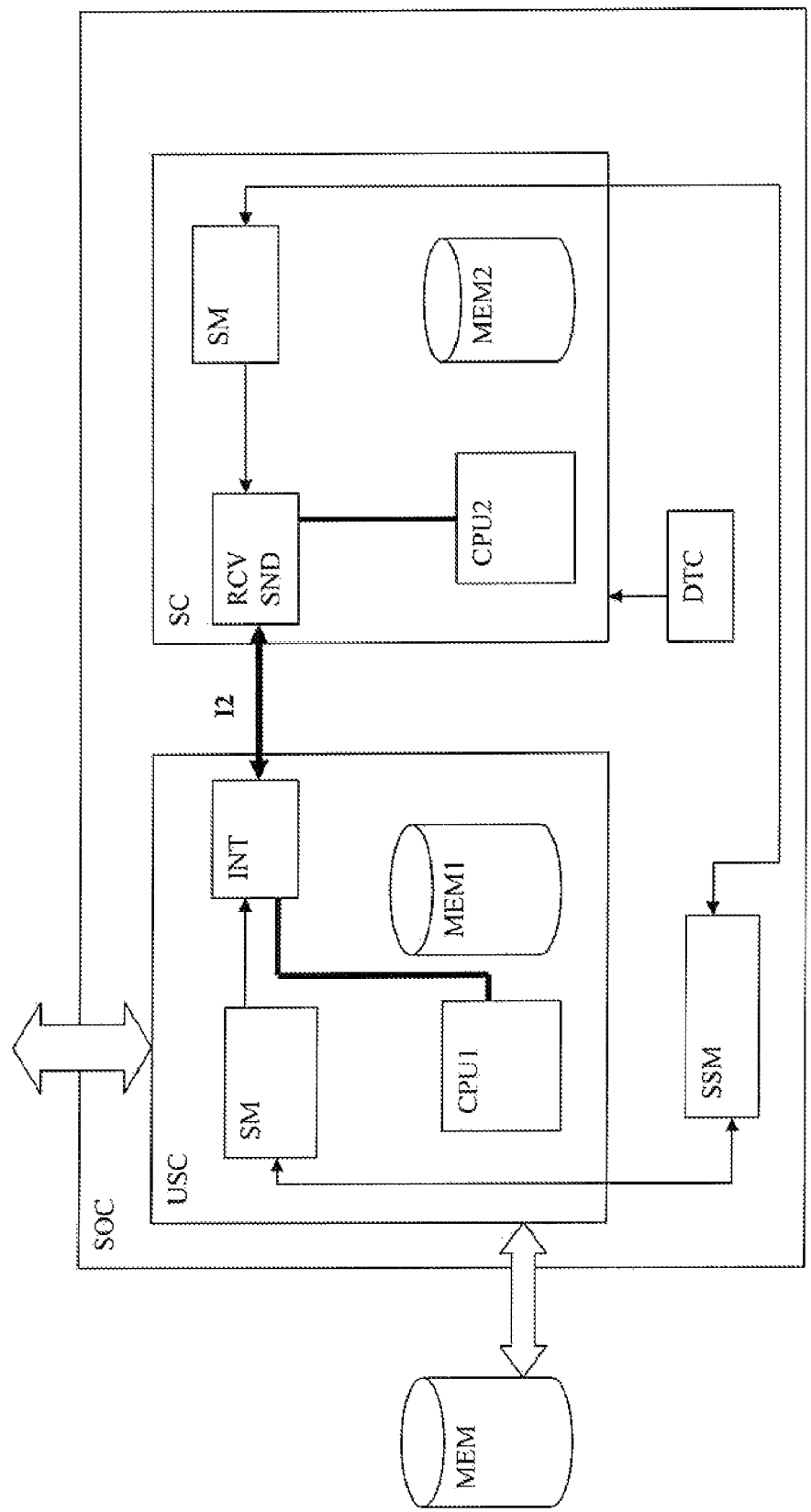

The FIG. 4 shows an enlarged system-on-chip SOC having two cores, one called unsecure core USC and the other one called secure core SC. The above description of the system-on-chip is now only a part of the enlarged SOC and correspond with the secure core SC. The unsecure part USC comprises processor CPU1 and internal memory MEM1. However, in view of the large programs and data processed by this processor, external memory MEM is necessary. Through the external memory or through the interface to the external world, the unsecure core can receive a Trojan program to catch the data receiving and sending through the internal interface 12. Therefore, the data received or requested by the unsecure core USC through the unsecure interface INT is to be considered as the same security level as external data. The secure core SC is still watching the activities of the unsecure code such as glitch detection, power analysis, light illumination, temperature change. These functions are located to the detector module DTC. This module informs the secure core of any abnormal condition thus leading to change the state of the supervision module SM. It is to be noted that the detector module can be located directly within the secure module SC.

According to a variant of the invention, the detector module DTC executes surveillance operations of the state of the system-on-cxhip SOC. It receives for example the positive supply Vdd (generally 5V) and observes risks behavior such as sudden changes of voltage, abnormally low or high voltage, According to the defined criteria it can inform the secure module SC for example by generating an error messages and thus deactivating certain functions of the aforementioned module. The communications interface 12 is watched by the detector module. By communication we understand all ways by which the information enters or goes out of the secure module. The detector module can also watch the operation of the unsecure module USC and their communication ways. This supervision encompass the power supply, the clock and the reset. In reaction to abnormal conditions detected by the detector module DTC, the secure module SC can reduce the access to sensitive data from the internal memory MEM2. The secure module SC can also initiate a reset of the unsecure module USC, thus restarting a complete check of the program and data environment.

The system of the invention is scalable, i.e. each system-on-chip comprises its own supervisor module as described above. When several system-on-chip are linked together to create a larger chip as shown in the FIG. 4, an additional super supervision module SSM is added to synchronize the supervisor module SM. A dedicated channel allows the communication between the supervisor modules SM of the single entity and the super supervisor module SSM of the chip. Each supervisor module comprises a state machine which describes the operations allowed during that state. The super supervisor module compares the states of the various entity and inform the entity supervisor module and the state of the other entity. An overall state machine handled by the super supervisor module controls that the state of the entities are compliant with the working scenario. For example, if one entity is in the state of receiving data form the other entity, the super supervisor module checks that the other entity is in the state of sending data.

In an alternative embodiment, the super supervisor module is located directly in the most secure entity, in our example in the secure system-on-chip SC.

The communication between each entity through the dedicated channel, is preferably encrypted with a key loaded during the initialization of the chip.

This key can be used to encrypt and decrypt the data exchanged between two supervision module or with the super supervision module, At the boot up of the chip, this key can be used to generate a temporary key, esg. using Diffie Hellmann algorithm.

The invention claimed is:

1. A secure system-on-chip for processing data, the secure system-on-chip comprising at least a central processing unit, an input and an output channel, an encryption/decryption engine, an autonomous supervision module having its own processor core and a memory, said secure system-on-chip having real-time working conditions pertaining to operations performed within the system-on-chip, said autonomous supervision module being preprogrammed with normal working conditions definitions and being configured to enable or disable the input and/or output channel according to a comparison of the real-time working conditions and the normal working conditions definitions, the normal working conditions definitions comprising an amount of data processed within the system-on-chip and time windows during which data processing operations within the system-on-chip are allowed.

2. The secure system-on-chip according to claim 1, wherein the supervision module is configured to receive the state condition of the central processing unit, and to enable or disable the output channel according to the central processing unit state condition.

3. The secure system-on-chip according to claim 1, wherein said input channel comprises an input encryption module to encrypt all incoming data, said output channel comprising an output decryption module to decrypt all outgoing data, said central processing unit receiving the encrypted data from the input encryption module and storing them in the memory, and while processing the stored data, said central processing unit reading the stored data from the memory, requesting decryption of same in the encryption/decryption engine, processing the data and requesting encryption of the result by the encryption/decryption engine and storing the encrypted result, outputting the result to the output decryption module for decryption purpose and exiting the decrypted result via the output channel.

4. The secure system-on-chip according to claim 3, wherein the input encryption module is a virtual module which pass the data to be encrypted to the encryption/decryption engine in encryption mode.

5. The secure system-on-chip according to claim 3, wherein the input encryption module is a virtual module which passes the data to be decrypted to the encryption/decryption engine in decryption mode.

6. The secure system-on-chip according to claim 3, wherein the algorithm to encrypt and decrypt the data is a symmetrical algorithm.

7. The secure system-on-chip according to claim 6, wherein the encryption/decryption algorithm uses a set of initialization constants and all or part of the initialization constants are randomly generated within the secure system-on-chip.

8. The secure system-on-chip according to claim 3, wherein the algorithm to encrypt and decrypt the data is an asymmetrical algorithm.

9. The secure system-on-chip according to claim 3, further comprising means to generate randomly the key or key pair used by the encryption/decryption engine.

10. The secure system-on-chip according to claim 1, wherein the encryption/decryption operations can be executed on one single data or a set of data at a time.

11. An electronic chip comprising the secure system-on-chip according to claim 1, said electronic chip comprising a first data link with an external world and the central processing unit, wherein the electronic chip further comprises a second data link to the input/output of the secure system-on-chip, and further comprises a supervision module which is preprogrammed with normal working conditions definitions of at least the first data link and the second data link, and means to disable the first and second data link if the current conditions exceed the normal conditions definitions.

12. The electronic chip of claim 11, further comprising a super supervision module communicating with the supervisor modules and checking if the working conditions of a first supervisor module are compatible with the working conditions of a second supervisor module.

13. The electronic chip of claim 11 wherein the super supervision module is part of the supervisor module of the system-on-chip, thus receiving the working conditions of the supervision module of the electronic chip.

14. The secure system-on-chip of claim 1, wherein the normal working condition definition of the amount of data processed within the system-on-chip is the amount of data outputted by the output channel and wherein the normal working condition definition of time windows during which data processing operations within the system-on-chip are allowed is time windows during which data output by the output channel are allowed.

15. The secure system-on-chip of claim 1, wherein the normal working condition definition of the amount of data processed within the system-on-chip is the amount of data processed by the encryption/decryption engine, and wherein the normal working condition definition of time windows during which data processing operations within the system-on-chip are allowed is time windows during which data processing by the encryption/decryption engine are allowed.

* * * * *